United States Patent
Chen et al.

(10) Patent No.: US 11,840,156 B2
(45) Date of Patent: Dec. 12, 2023

(54) BATTERY LOCKING/UNLOCKING SYSTEM, ELECTRIC VEHICLE BATTERY SWAPPING CONTROL SYSTEM AND CONTROL METHOD THEREOF

(71) Applicants: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

(72) Inventors: Zhihao Chen, Shanghai (CN); Chunhua Huang, Shanghai (CN); Danliang Qiu, Shanghai (CN)

(73) Assignees: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 663 days.

(21) Appl. No.: 16/768,087

(22) PCT Filed: Feb. 12, 2018

(86) PCT No.: PCT/CN2018/076365
§ 371 (c)(1),
(2) Date: May 29, 2020

(87) PCT Pub. No.: WO2019/104880
PCT Pub. Date: Jun. 6, 2019

(65) Prior Publication Data
US 2020/0317081 A1    Oct. 8, 2020

(30) Foreign Application Priority Data

Nov. 30, 2017 (CN) .......................... 201711244224.7

(51) Int. Cl.
| | |
|---|---|
| *H01M 50/202* | (2021.01) |
| *H01M 50/264* | (2021.01) |
| *B60L 53/80* | (2019.01) |
| *B60K 1/04* | (2019.01) |
| *B60S 5/06* | (2019.01) |

(52) U.S. Cl.
CPC .............. *B60L 53/80* (2019.02); *B60K 1/04* (2013.01); *B60S 5/06* (2013.01); *H01M 50/202* (2021.01); *H01M 50/264* (2021.01); *H01M 2220/20* (2013.01)

(58) Field of Classification Search
CPC ... B60L 53/80; B60K 1/04; B60K 2001/0438; B60K 2001/0472; B60K 2001/0455; B60S 5/06; H01M 50/202; H01M 50/264; H01M 2220/20; Y02E 60/10; Y02T 90/16
See application file for complete search history.

(56) References Cited

U.S. PATENT DOCUMENTS

| | | | |
|---|---|---|---|
| 8,708,728 B2 | 4/2014 | Hirashita et al. | |
| 2020/0055383 A1* | 2/2020 | Zhang | ..................... B60L 50/64 |

FOREIGN PATENT DOCUMENTS

| | | |
|---|---|---|
| CN | 102490694 A | 6/2012 |
| CN | 102717778 A | 10/2012 |
| CN | 104417382 A | 3/2015 |
| CN | 205034089 U | 2/2016 |
| CN | 205255985 U | 5/2016 |
| CN | 105857048 A | 8/2016 |
| CN | 106427514 A | 2/2017 |
| CN | 108128132 A | 6/2018 |
| DE | 102009042001 A1 | 3/2011 |
| DE | 102012219080 A1 | 4/2014 |
| FR | 2933656 A1 | 1/2010 |
| WO | 2012052511 A1 | 4/2012 |

OTHER PUBLICATIONS

Extended European Search Report dated Aug. 2, 2021 issued in counterpart European Application No. 18883608.4.
First Office Action dated Mar. 8, 2022 issued in Indian Patent Application No. 202027027028.
Aug. 30, 2020 International Search Report issued in International Patent Application No. PCT/CN2018/076365.
Aug. 30, 2020 Written Opinion of the International Searching Authority issued in International Patent Application No. PCT/CN2018/076365.
Jun. 9, 2020 First Office Action and First Search Report issued in Chinese priority application No. 201711244224.7.
Feb. 2, 2021 Chinese Second Office Action issued in Chinese Patent Application No. 201711244224.7.

(Continued)

*Primary Examiner* — Muhammad S Siddiquee

(57) ABSTRACT

Provided are a battery locking/unlocking system, and an electric vehicle battery swapping control system and a control method thereof. The battery locking/unlocking system comprises a battery swapping device used for moving a battery; a lock shaft detection unit used for generating a location signal; a lock tongue control unit used for controlling a lock tongue to fall into the lock slot or retract to the outside of the lock slot; a data exchange unit separately communicates with the battery swapping device and the lock shaft detection unit. According to the battery locking/unlocking system and locking and unlocking control methods, by providing various location detection components, the battery is accurately located and locked when being loaded into a fixing base, and then accurately located and unlocked when being removed, thereby achieving full-automatic control during swapping of the battery and improving the swapping speed and success rate of the battery.

11 Claims, 5 Drawing Sheets

(56) References Cited

OTHER PUBLICATIONS

Feb. 24, 2023 Oral proceeding issued in Indian Patent Application No. 202027027028.
First Office Action dated Jan. 10, 2022 issued in Indonesian Patent Application No. P00202005345.

* cited by examiner

BATTERY LOCKING/UNLOCKING SYSTEM, ELECTRIC VEHICLE BATTERY SWAPPING CONTROL SYSTEM AND CONTROL METHOD THEREOF

CROSS REFERENCE TO RELATED APPLICATIONS

This application is a National Stage of International Application No. PCT/CN2018/076365, filed on Feb. 12, 2018, which requests the priority of the Chinese patent application with the application No. 201711244224.7, filed on Nov. 30, 2017, the contents of which are incorporated herein by reference in their entireties.

FIELD

The present invention relates to a battery locking/unlocking system and locking and unlocking control methods.

The present invention further relates to an electric vehicle battery swapping control system and a control method thereof.

BACKGROUND

An existing battery installation way of an electric vehicle generally comprises a fixed way and a swappable way. For the fixed way, a battery is generally fixed on the vehicle, and thus, the vehicle is directly used as a charged object when the battery is charged. For the swappable way, a battery generally adopts a movable installation way, and thus, the battery may be taken down at any time to swap a new battery.

Battery locking and unlocking are involved in a new battery swapping process. An existing battery locking/unlocking method may not accurately control strokes of a battery swapping device and the battery, errors appear during the swapping of the battery, thereby affecting the swapping speed and success rate of the battery.

SUMMARY

The technical problem to be solved by the present invention is to provide a battery locking/unlocking system, an electric vehicle battery swapping control system and a control method thereof in order to overcome the defect that a battery locking/unlocking method in the prior art may not accurately control strokes of a battery swapping device and a battery.

The above-mentioned technical problem is solved through the following technical solution:

the present invention provides a battery locking/unlocking system used for a connection between a battery and a fixing base, the battery is provided with a plurality of lock shafts, the fixing base is internally provided with a plurality of lock seats, the lock seats are provided with lock slots for snapping the lock shafts, the lock slots are internally provided with lock tongues, and the battery locking/unlocking system includes:

a battery swapping device, used for moving the battery;

a lock shaft detection unit, located in the lock slots and used for detecting the locations of the lock shafts in the lock slots and generating location signals;

a lock tongue control unit, used for controlling the lock tongues to fall into the lock slots or retract to the outsides of the lock slots; and a data exchange unit, separately communicating with the battery swapping device and the lock shaft detection unit;

the lock shaft detection unit sends the location signals to the data exchange unit; the data exchange unit sends the location signals to the battery swapping device, and the battery swapping device adjusts the location of the battery according to the location signals; the battery swapping device further generates a locking stopping instruction or an unlocking instruction according to the location signals and sends the locking stopping instruction or the unlocking instruction to the lock tongue control unit, the lock tongue control unit controls the lock tongues to fall into the lock slots when receiving the locking stopping instruction or controls the lock tongues to retract to the outsides of the lock slots when receiving the unlocking instruction.

Preferably, the lock slots include entry sections and locking sections communicating with each other, the lock shaft detection unit includes upper in-place sensors, and the upper in-place sensors are located in the entry sections;

the upper in-place sensors are used for detecting whether the lock shafts arrive at junctions of the entry sections and the locking sections or not, if yes, a first location signal is sent to the data exchange unit, the data exchange unit sends the first location signal to the battery swapping device, and the battery swapping device enables the battery to move to the entry sections or the locking sections according to the first location signal.

Preferably, the lock slots include entry sections and locking sections communicating with each other, the lock shaft detection unit includes front in-place sensors, and the front in-place sensors are located in the locking sections;

the front in-place sensors are used for detecting whether the lock shafts arrive at locking locations or not, if yes, a second location signal is sent to the battery swapping device by the data exchange unit, the battery swapping device stops horizontally moving the battery according to the second location signal and generates the locking stopping instruction, the battery swapping device sends the locking stopping instruction to the lock tongue control unit, and the lock tongue control unit controls the lock tongues to fall into the lock slots when receiving the locking stopping instruction.

Preferably, the lock shaft detection unit further includes locking sensors; the locking sensors are used for detecting whether the lock shafts are locked by the lock tongues or not; if yes, the locking sensors generate a locking signal to be sent to the data exchange unit; and if not, a warning signal is sent to the data exchange unit, and the data exchange unit gives an alarm according to the warning signal.

Preferably, the battery locking/unlocking system further includes a locking location detection unit located on the battery swapping device; and the locking location detection unit is used for detecting relative locations of the battery and the fixing base and generating a locking location signal to be sent to the data exchange unit, the data exchange unit generates a locking adjustment instruction according to the locking location signal and sends the locking adjustment instruction to the battery swapping device, the location of the battery swapping device is adjusted according to the locking adjustment instruction until the battery is located in the fixing base.

Preferably, the locking location detection unit includes a first visual sensor, the first visual sensor detects the deviation between openings of the lock slots and the lock shafts by acquiring images of the openings of the lock slots and the lock shafts and generates a first deviation signal to be sent to the data exchange unit, the data exchange unit generates a first walking instruction according to the first deviation signal and sends the first walking instruction to the battery swapping device, and the battery swapping device walks according to the first walking instruction until the lock shafts directly face the openings of the lock slots; and preferably, the locking location detection unit includes a first range finder, in a process that the battery moves to the fixing base, the first range finder measures a distance from the battery to the ground, compares the distance with a preset value and generates a first distance signal to be sent to the data exchange unit, the data exchange unit generates a first movement instruction according to the first distance signal and sends the first movement instruction to the battery swapping device, and the battery swapping device moves the battery according to the first movement instruction until the battery is located in the fixing base.

Preferably, the battery locking/unlocking system further includes an unlocking location detection unit located on the battery swapping device; the unlocking location detection unit is used for detecting relative locations of the battery swapping device and the battery and generating an unlocking location signal to be sent to the data exchange unit, the data exchange unit generates an unlocking adjustment instruction according to the unlocking location signal and sends the unlocking adjustment instruction to the battery swapping device, and the location of the battery swapping device is adjusted according to the unlocking adjustment instruction until the battery swapping device lifts the battery.

Preferably, the unlocking location detection unit includes a second visual sensor, the second visual sensor detects the deviation between the battery and the battery swapping device by acquiring images of the battery and the battery swapping device and generates a second deviation signal to be sent to the data exchange unit, the data exchange unit generates a second walking instruction according to the second deviation signal and sends the second walking instruction to the battery swapping device, and the battery swapping device walks according to the second walking instruction until the battery swapping device directly faces the battery.

Preferably, the unlocking location detection unit includes a second range finder, the second range finder measures a distance from the battery swapping device to the ground, compares the distance with a preset value and generates a second distance signal to be sent to the data exchange unit, the data exchange unit generates a second movement instruction according to the second distance signal and sends the second movement instruction to the battery swapping device, and the battery swapping device moves according to the second movement instruction until the battery swapping device lifts the battery.

Preferably, the lock tongue control unit includes a lock connecting rod and a linkage mechanism driving the lock connecting rod to act; and the lock tongues in the plurality of lock seats are connected through the lock connecting rod.

Preferably, the linkage mechanism is in communication connection with the data exchange unit, the data exchange unit sends the locking stopping instruction to the linkage mechanism, the linkage mechanism drives the plurality of lock tongues to act through the lock connecting rod when receiving the locking stopping instruction, and the lock tongues fall into the lock slots.

Preferably, the lock tongue control unit includes an unlocking ejector rod, the data exchange unit sends the unlocking instruction to the lock tongue control unit, when the lock tongue control unit receives the unlocking instruction, the unlocking ejector rod jacks up the lock connecting rod, and the lock connecting rod drives the lock tongues to leave from the lock slots.

Preferably, the battery locking/unlocking system further includes a power switching unit used for controlling whether the battery supplies power to an external device or not, the battery swapping device sends a power failure signal to the power switching unit before sending the unlocking instruction, and the power switching unit controls the battery to stop supplying power to the external device.

The present invention further provides an electric vehicle battery swapping control system, and the electric vehicle battery swapping control system includes the above-mentioned battery locking/unlocking system.

The present invention further provides a battery locking control method for locking a battery in a fixing base, the battery is provided with a plurality of lock shafts, the fixing base is internally provided with a plurality of lock seats, the lock seats are provided with lock slots for snapping the lock shafts, the lock slots are internally provided with lock tongues, and the battery locking control method includes the following steps:

moving the battery to the fixing base to enable the lock shafts to enter the lock slots;

after the lock shafts enter the lock slots, detecting the locations of the lock shafts, and moving the battery until the lock shafts arrive at locking locations; and With the lock tongues falling, snapping the lock shafts into the lock slots.

Preferably, the lock slots include entry sections and locking sections communicating with each other, after the lock shafts enter the lock slots, detecting the locations of the lock shafts, and moving the battery until the lock shafts arrive at locking locations, includes:

upon detecting the case that the lock shafts arrive at junctions of the entry sections and the locking sections, changing a movement direction of the battery, and controlling the lock shafts to enter the locking sections; and upon detecting the case that the lock shafts arrive at the locking locations, pausing the movement of the battery.

Preferably, after controlling the lock tongues to fall, and snapping the lock shafts into the lock slots, the locations of the lock tongues are detected, and whether the lock tongues snap the lock shafts or not is judged; if not, an alarm is given.

Preferably, before moving the battery to the fixing base to enable the lock shafts to enter the lock slots, relative locations of the lock shafts and openings of the lock slots are detected, and the location of the battery is adjusted to enable the lock shafts to directly face the openings of the lock slots.

Preferably, moving the battery to the fixing base to enable the lock shafts to enter the lock slots includes:

detecting a distance from the battery to the ground, and adjusting the location of the battery until the lock shafts enter the lock slots.

Preferably, the lock tongues in the plurality of lock seats are connected through a lock connecting rod, and the lock connecting rod is connected with a linkage mechanism;

controlling the lock tongues to fall, and snapping the lock shafts into the lock slots, includes:

controlling the linkage mechanism to act, and driving, by the linkage mechanism, the plurality of lock tongues to fall together through the lock connecting rod.

The present invention further provides a battery unlocking control method for unlocking a battery in a fixing base, the battery is provided with a plurality of lock shafts, the fixing base is internally provided with a plurality of lock seats, the lock seats are provided with lock slots for snapping the lock shafts, the lock shafts are snapped into the lock slots through lock tongues, and the battery unlocking control method includes the following steps:

moving the lock tongues located in the lock slots to the outsides of the lock slots, and controlling a battery swapping device to lift the battery;

moving the battery to enable the lock shafts to move towards openings of the lock slots; and detecting locations of the lock shafts until the lock shafts are removed from the openings of the lock slots to the outsides of the lock slots.

Preferably, the lock slots include entry sections and locking sections communicating with each other, the locking sections are horizontally arranged, and the entry sections are perpendicular to the locking sections;

detecting locations of the lock shafts until the lock shafts are removed from the openings of the lock slots to the outsides of the lock slots includes:

upon detecting the case that the lock shafts horizontally move to junctions of the locking sections and the entry sections, changing a movement direction of the battery, and controlling the lock shafts to enter the entry sections; and downwards moving the lock shafts until the lock shafts are moved to the outsides of the lock slots.

Preferably, the lock tongues in the plurality of lock seats are connected through a lock connecting rod, the lock connecting rod is connected with a linkage mechanism, and the battery swapping device is provided with an unlocking ejector rod, moving the lock tongues located in the lock slots to the outsides of the lock slots, and controlling a battery swapping device to lift the battery, includes:

controlling the unlocking ejector rod to jack up the lock connecting rod to drive the lock tongues to move to the outsides of the lock slots while controlling the battery swapping device to lift the battery.

Preferably, before moving the lock tongues located in the lock slots to the outsides of the lock slots, and controlling a battery swapping device to lift the battery, relative locations of the battery and the battery swapping device are detected, and the battery swapping device is enabled to directly face the battery.

Preferably, moving the lock tongues located in the lock slots to the outsides of the lock slots, and controlling a battery swapping device to lift the battery, includes:

detecting a distance from the battery swapping device to the battery until the battery swapping device lifts the battery.

Preferably, the battery locking/unlocking system further includes a power switching unit, before moving the lock tongues located in the lock slots to the outsides of the lock slots, and controlling a battery swapping device to lift the battery, power between the fixing base and the battery located in the fixing base is cut off.

The present invention further provides an electric vehicle battery swapping control method, and the electric vehicle battery swapping control method includes the above-mentioned battery locking control method or the above-mentioned battery unlocking control method.

The above-mentioned preferred conditions may be combined randomly on the basis of conforming to the general knowledge in the field to obtain each preferred embodiment of the present invention.

The positive progress effect of the present invention lies in that:

according to the above-mentioned battery locking/unlocking system, the electric vehicle battery swapping control system and the control method thereof, by providing various location detection components, the battery is accurately located and locked when being loaded into the fixing base, and then accurately located and unlocked when being removed from the fixing base, thereby achieving full-automatic control during swapping of the battery and improving the swapping speed and success rate of the battery.

DESCRIPTION OF SYMBOLS IN ACCOMMODATING DRAWINGS

Figure 1:
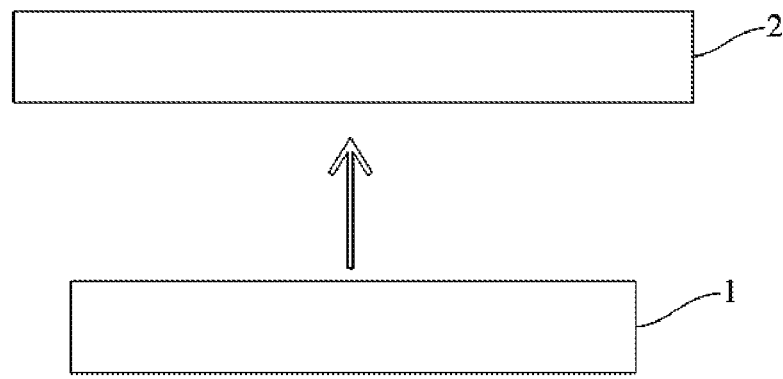
FIG. 1 is a schematic structural diagram of a battery and a fixing base involved in a battery locking/unlocking system provided by the present invention.

Battery 1
Lock shaft 11.
Fixing base 2
Lock seat 21
Lock slot 22
Entry section 221
Locking section 222
Lock tongue 23
Battery locking/unlocking system 3
Battery swapping device 31
Lock shaft detection unit 32
Upper in-place sensor 321
Front in-place sensor 322
Locking sensor 323
Lock tongue control unit 33
Lock connecting rod 331
Unlocking groove 332
Unlocking ejector rod 333
Data exchange unit 34
Locking location detection unit 35
Unlocking location detection unit 36
Power switching unit 37

DETAILED DESCRIPTION OF THE EMBODIMENTS

The present invention is further described below with embodiments, but the present invention is not hence limited within the range of the embodiments.

Figure 2:
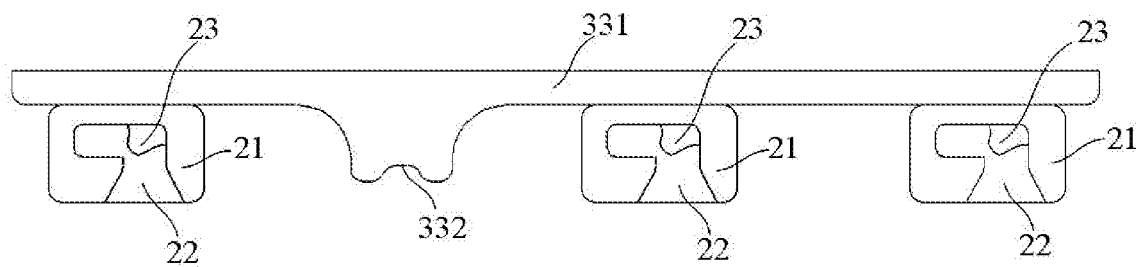
FIG. 2 is a schematic structural diagram of a lock tongue control unit and lock seats involved of a battery locking/unlocking system provided by the present invention.
Figure 3:
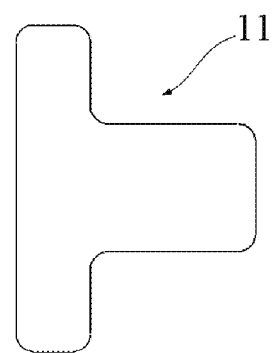
FIG. 3 is a schematic structural diagram of a lock shaft involved in a battery locking/unlocking system provided by the present invention.

A battery locking/unlocking system 3 provided by the present invention is used for a connection between a battery 1 and a fixing base 2, as shown in FIG. 1, the battery 1 may be mounted in the fixing base 2. As shown in FIG. 2, the battery 1 is provided with a plurality of lock shafts 11. As shown in FIG. 3, the fixing base 2 is internally provided with a plurality of lock seats 21, the lock seats 21 are provided with lock slots 22 for snapping the lock shafts 11, the lock slots 22 are internally provided with lock tongues 23.

Figure 4:
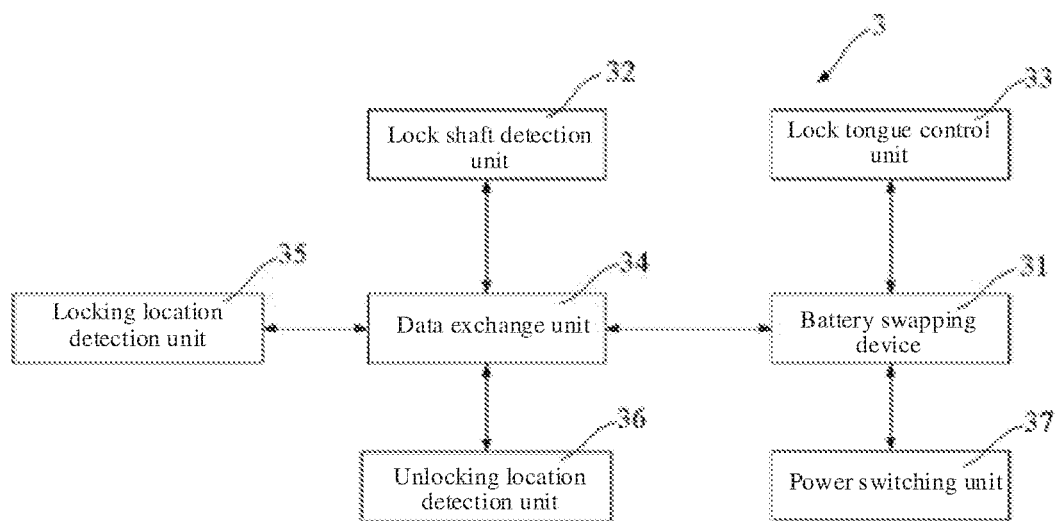
FIG. 4 is a schematic structural diagram of a battery locking/unlocking system provided by the present invention.

The battery locking/unlocking system 3 provided by the present invention, as shown in FIG. 4, includes a battery swapping device 31, a lock shaft detection unit 32, a lock tongue control unit 33 and a data exchange unit 34, the battery swapping device 31 is used for moving the battery 1, the lock shaft detection unit 3:2 is located in the lock slots 22 and is used for detecting the locations of the lock shafts 11 in the lock slots 22 and generating location signals, the lock tongue control unit 33 is used for controlling the lock tongues 23 to fall into the lock slots 22 or retract to the outsides of the lock slots 22, and the data exchange unit 34 separately communicates with the battery swapping device 31 and the lock shaft detection unit 32.

During use, the lock shaft detection unit 32 sends the location signals to the data exchange unit 34; the data exchange unit 34 sends the location signals to the battery swapping device 31, and the battery swapping device 31 adjusts the location of the battery 1 according to the location signals. When the battery 1 is required to be locked, the battery swapping device 31 generates a locking stopping instruction according to the location signals and sends the locking stopping instruction to the lock tongue control unit 33, the lock tongue control unit 33 controls the lock tongues 23 to fall into the lock slots 22 when receiving the locking stopping instruction, and thus, the lock shafts 11 are snapped into the lock slots 22 through the lock tongues 23. When the battery 1 is required to be unlocked, the battery swapping device 31 generates an unlocking instruction according to the location signals and sends the unlocking instruction to the lock tongue control unit 33, the lock tongue control unit 33 controls the lock tongues 23 to retract to the outsides of the lock slots 22 when receiving the unlocking instruction, and thus, the lock shafts 11 may be removed from the lock slots 22.

Figure 5:
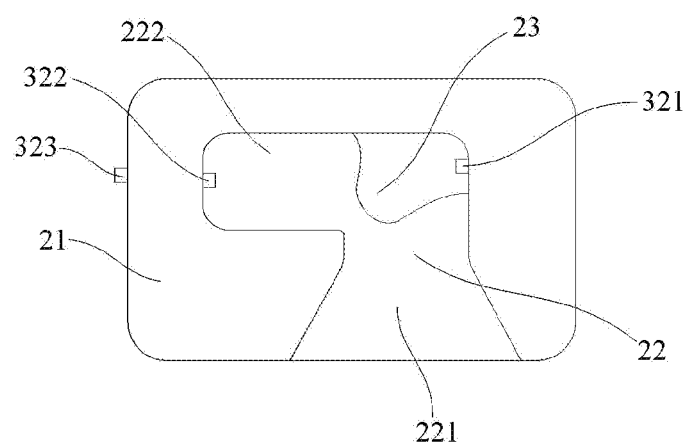
FIG. 5 is a schematic structural diagram of a lock shaft detection unit and lock seats of a battery locking/unlocking system provided by the present invention.

As shown in FIG. 5, the lock slots 22 include entry sections 221 and locking sections 222 communicating with each other, the lock shaft detection unit 32 includes upper in-place sensors 321 and front in-place sensors 322, the upper in-place sensors 321 are located in the entry sections 221, and the front in-place sensors 322 are located in the locking sections 222.

The upper in-place sensors 321 are used for detecting whether the lock shafts 11 arrive at junctions of the entry sections 221 and the locking sections 222 or not, if yes, a first location signal is sent to the data exchange unit 34, the data exchange unit 34 sends the first location signal to the battery swapping device 31, and the battery swapping device 31 enables the lock shafts 11 to move to the entry sections 221 or the locking sections 222 according to the first location signal.

By providing the upper in-place sensors 321, whether the lock shafts 11 arrive at the junctions of the entry sections 221 and the locking sections 222 or not may be monitored at any moment. When the lock shafts 11 arrive at the junctions of the entry sections 221 and the locking sections 222, the battery swapping device 31 may control the battery 1 to change a direction in time so as to enable the lock shafts 11 to move to the entry sections 221 or the locking sections 222.

The front in-place sensors 322 are used for detecting whether the lock shafts 11 arrive at locking locations or not, if yes, a second location signal is sent to the battery swapping device 31 by the data exchange unit 34, the battery swapping device 31 stops horizontally moving the battery 1 according to the second location signal and generates a locking stopping instruction, the battery swapping device 31 sends the locking stopping instruction to the lock tongue control unit 33, and the lock tongue control unit 33 controls the lock tongues 23 to fall into the lock slots 22 when receiving the locking stopping instruction.

By providing the front in-place sensors 322, whether the lock shafts 11 arrive at the locking locations or not may be monitored at any moment. When the lock shafts 11 arrive at the locking locations, the battery swapping device 31 may control the battery 1 to pause in time, the lock tongue control unit 33 controls the lock tongues 23 to fall into the lock slots 22, and thus, the lock shafts 11 are snapped into the lock slots 22.

As shown in FIG. 5, the lock shaft detection unit 32 further includes locking sensors 323; the locking sensors 323 are used for detecting whether the lock shafts 11 are locked by the lock tongues 23 or not; if yes, the locking sensors 323 generate a locking signal to be sent to the data exchange unit 34; and if not, a warning signal is sent to the data exchange unit 34, and the data exchange unit 34 gives an alarm according to the warning signal.

The locking sensors 323 are used for detecting whether the lock tongues 23 arrive at locations where the lock shafts 11 are snapped or not, if the lock tongues 23 have snapped the lock shafts 11, the data exchange unit 34 sends a signal to the battery swapping device 31, the battery swapping device 31 puts down the battery 1 and retracts. If the lock tongues 23 do not snap the lock shafts 11, the data exchange unit 34 gives an alarm to wait for operating staff to remove obstacles.

As shown in FIG. 4, the battery locking/unlocking system 3 further includes a locking location detection unit 35 located on the battery swapping device 31; and the locking location detection unit 35 is used for detecting relative locations of the battery 1 and the fixing base 2 and generating a locking location signal to be sent to the data exchange unit 34, the data exchange unit 34 generates a locking adjustment instruction according to the locking location signal and sends the locking adjustment instruction to the battery swapping device 31, the location of the battery swapping device 31 is adjusted according to the locking adjustment instruction until the battery 1 is located in the fixing base 2.

The locking location detection unit 35 includes a first visual sensor, the first visual sensor detects the deviation between openings of the lock slots 22 and the lock shafts 11 by acquiring images of the openings of the lock slots 22 and the lock shafts 11 and generates a first deviation signal to be sent to the data exchange unit 34, the data exchange unit 34 generates a first walking instruction according to the first deviation signal and sends the first walking instruction to the battery swapping device 31, and the battery swapping device 31 walks according to the first walking instruction until the lock shafts 11 directly face the openings of the lock slots 22.

The first visual sensor is used for measuring relative locations of the lock shafts 11 and the openings of the lock slots 22 in a horizontal direction. When the lock shafts 11 directly face the bottoms of the openings of the lock slots 22, the battery swapping device 31 stops horizontally moving and upwards lifts the battery 1.

The locking location detection unit 35 includes a first range finder, in a process that the battery 1 moves to the fixing base 2, the first range finder measures a distance from the battery 1 to the ground, compares the distance with a preset value and generates a first distance signal to be sent to the data exchange unit 34, the data exchange unit 34 generates a first movement instruction according to the first distance signal and sends the first movement instruction to the battery swapping device 31, and the battery swapping device 31 moves the battery 1 according to the first movement instruction until the battery 1 is located in the fixing base 2.

The first range finder measures the distance from the battery 1 to the ground and compares the distance with the preset value. When the distance from the battery 1 to the ground reaches the preset value, it shows that the battery 1 is located in the fixing base 2, and the lock shafts 11 have been located in the lock slots 22.

As shown in FIG. 4, the battery locking/unlocking system 3 further includes an unlocking location detection unit 36 located on the battery swapping device 31; the unlocking location detection unit 36 is used for detecting relative locations of the battery swapping device 31 and the battery 1 and generating an unlocking location signal to be sent to the data exchange unit 34, the data exchange unit 34 generates an unlocking adjustment instruction according to the unlocking location signal and sends the unlocking adjustment instruction to the battery swapping device 31, and the location of the battery swapping device 31 is adjusted according to the unlocking adjustment instruction until the battery swapping device 31 lifts the battery 1.

The unlocking location detection unit 36 includes a second visual sensor, the second visual sensor detects the deviation between the battery 1 and the battery swapping device 31 by acquiring images of the battery 1 and the battery swapping device 31 and generates a second deviation signal to be sent to the data exchange unit 34, the data exchange unit 34 generates a second walking instruction according to the second deviation signal and sends the second walking instruction to the battery swapping device 31, and the battery swapping device 31 walks according to the second walking instruction until the battery swapping device 31 directly faces the battery 1.

The second visual sensor is used for measuring relative locations of the battery swapping device 31 and the battery 1 in a horizontal direction. When the battery swapping device 31 directly faces the battery 1, the battery swapping device 31 stops horizontally moving and upwards lifts the battery 1.

The unlocking location detection unit 36 includes a second range finder, the second range finder measures a distance from the battery swapping device 31 to the ground, compares the distance with a preset value and generates a second distance signal to be sent to the data exchange unit 34, the data exchange unit 34 generates a second movement instruction according to the second distance signal and sends the second movement instruction to the battery swapping device 31, and the battery swapping device 31 moves according to the second movement instruction until the battery swapping device 31 lifts the battery 1.

The second range finder measures the distance from the battery swapping device 31 to the ground and compares the distance with the preset value. When the distance from the battery swapping device 31 to the ground reaches the preset value, it shows that the battery 1 has been lifted by the battery swapping device 31.

The above-mentioned first visual sensor and the above-mentioned second visual sensor may be designed to be one visual sensor by which functions of the first visual sensor and the second visual sensor are achieved at the same time.

The above-mentioned first range finder and the above-mentioned second range finder may be designed to be one range finder by which functions of the first range finder and the second range finder are achieved at the same time.

As shown in FIG. 2, the lock tongue control unit 33 includes a lock connecting rod 331 and a linkage mechanism driving the lock connecting rod 331 to act; and the lock tongues 23 in the plurality of lock seats 21 are connected through the lock connecting rod 331.

In a process that the battery 1 is locked, the linkage mechanism is in communication connection with the data exchange unit 34, the data exchange unit 34 sends the locking stopping instruction to the linkage mechanism, the linkage mechanism drives the plurality of lock tongues 23 to act through the lock connecting rod 331 when receiving the locking stopping instruction, and the lock tongues 23 fall into the lock slots 22.

Figure 6:
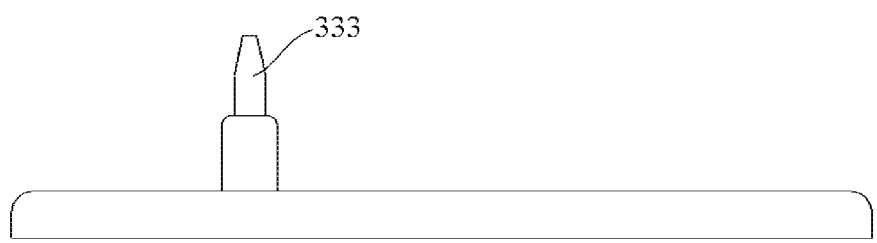
FIG. 6 is a schematic structural diagram of an unlocking ejector rod of a lock tongue control unit of a battery locking/unlocking system provided by the present invention.

As shown in FIG. 2 and FIG. 6, the lock tongue control unit 33 includes an unlocking ejector rod 333 by which the lock connecting rod 331 may be jacked up. In order to provide convenience for the unlocking ejector rod 333 to jack up the lock connecting rod 331, the lock connecting rod 331 is provided with an unlocking groove 332 matched with the top of the unlocking ejector rod 333. When the unlocking ejector rod 333 jacks up the lock connecting rod 331, the top of the unlocking ejector rod 333 is located in the unlocking groove 332.

In a process that the battery 1 is unlocked, the data exchange unit 34 sends the unlocking instruction to the lock tongue control unit 33, when the lock tongue control unit 33 receives the unlocking instruction, the unlocking ejector rod 333 jacks up the lock connecting rod 331, and the lock connecting rod 331 drives the lock tongues 23 to leave from the lock slots 22.

As shown in FIG. 4, the battery locking/unlocking system 3 further includes a power switching unit 37 used for controlling the battery 1 to supply power to an external device or not, the battery swapping device 31 sends a power failure signal to the power switching unit 37 before sending the unlocking instruction, and the power switching unit 3'7 controls the battery 1 to stop supplying power to the external device.

By providing the above-mentioned battery locking/unlocking system 3, the battery 1 may be loaded into the fixing base 2 and locked, or the battery 1 is unlocked and is taken out of the fixing base 2.

When the above-mentioned battery locking/unlocking system 3 is applied to an electric vehicle battery swapping control system, a battery of an electric vehicle may be accurately controlled when being locked and unlocked, thereby achieving full-automatic control during swapping of the battery and improving the swapping speed and success rate of the battery.

Figure 7:
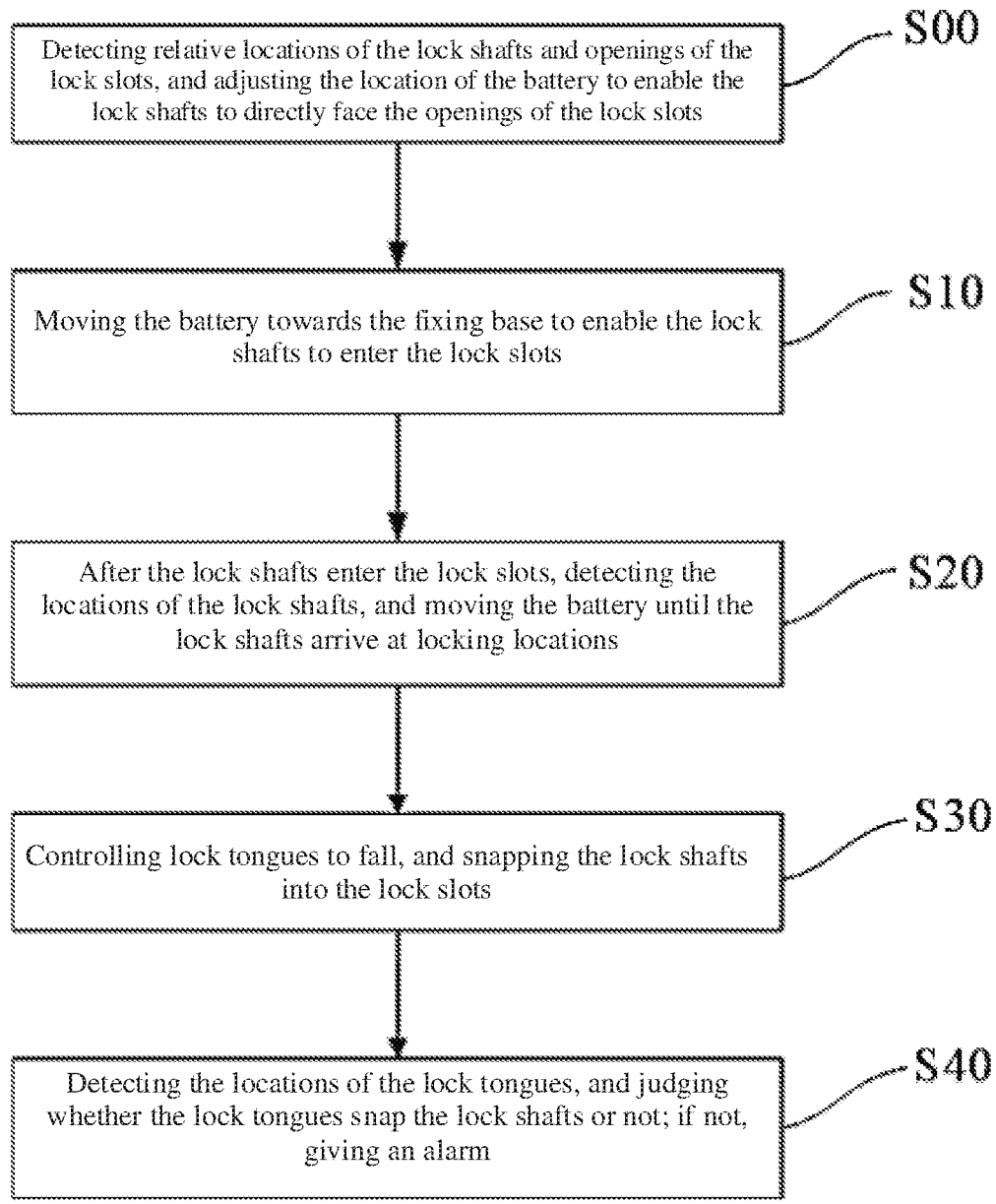
FIG. 7 is a flow diagram of a battery locking control method provided by the present invention.

As shown in FIG. 7, the present invention further provides a battery locking control method including the following steps:

S10, a battery 1 is moved towards a fixing base 2 to enable lock shafts 11 to enter lock slots 22;

S20, after the lock shafts 11 enter the lock slots 22, the locations of the lock shafts 11 are detected, and the battery 1 is moved until the lock shafts 11 arrive at locking locations; and S30, lock tongues 23 are controlled to fall, and the lock shafts 11 are snapped into the lock slots 22.

By using the above-mentioned battery locking control method, the battery 1 may be accurately moved to the inside of the fixing base 2, and the lock shafts 11 are snapped into the lock slots 22 through the lock tongues 23.

Figure 8:
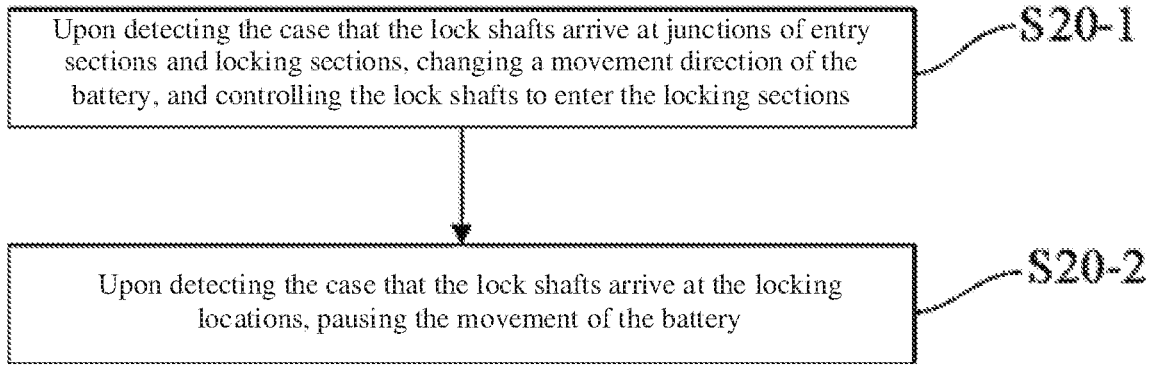
FIG. 8 is a flow diagram of step S20 of the battery locking control method as shown in FIG. 7.

As shown in FIG. 8, step S20 that after the lock shafts 11 enter the lock slots 22, the locations of the lock shafts 11 are detected, and the battery 1 is moved until the lock shafts 11 arrive at locking locations includes: step S20-1, when it is detected that the lock shafts 11 arrive at junctions of entry sections 221 and locking sections 222, a movement direction of the battery 1 is changed, and the lock shafts 11 are controlled to enter the locking sections 222; and step S20-2, when it is detected that the lock shafts 11 arrive at the locking locations, and the movement of the battery 1 is paused. Further, whether the lock shafts 11 arrive at the junctions of the entry sections 221 and the locking sections 222 or not is detected by upper in-place sensors 321; and whether the lock shafts 11 arrive at the locking locations or not is detected by front in-place sensors 322.

After step S30 that lock tongues 23 are controlled to fall, and the lock shafts 11 are snapped into the lock slots 22, there is also step S40 including: the locations of the lock tongues 23 are detected, and whether the lock tongues 23 snap the lock shafts 11 or not is judged; if not, an alarm is given.

Before step S10 that a battery 1 is moved towards a fixing base 2 to enable lock shafts 11 to enter lock slots 22, there is also step S00 including: relative locations of the lock shafts 11 and openings of the lock slots 22 are detected, and the location of the battery 1 is adjusted to enable the lock shafts 11 to directly face the openings of the lock slots 22.

Step S10 that a battery 1 is moved towards a fixing base 2 to enable lock shafts 11 to enter lock slots 22 specifically includes: a distance from the battery 1 to the ground is detected, and the location of the battery 1 is adjusted until the lock shafts 11 enter the lock slots 22.

Step S30 that lock tongues 23 are controlled to fall, and the lock shafts 11 are snapped into the lock slots 22 specifically includes: a linkage mechanism is controlled to act, and the linkage mechanism drives the plurality of lock tongues 23 to fall together through a lock connecting rod 331.

A specific embodiment of the above-mentioned battery locking control method is that:

step S00, relative positions of lock shafts 11 and openings of lock slots 22 are detected, and the location of a battery 1 is adjusted to enable the lock shafts 11 to directly face the openings of the lock slots 22. The relative positions of the lock shafts 11 and the openings of the lock slots 22 are detected by a first visual sensor in a locking location detection unit 35, and the first visual sensor is used for measuring the relative positions of the lock shafts 11 and the openings of the lock slots 22 in a horizontal direction. The first visual sensor detects the deviation between the openings of the lock slots 22 and the lock shafts 11 by acquiring images of the openings of the lock slots 22 and the lock shafts 11 and generates a first deviation signal to be sent to a data exchange unit 34, the data exchange unit 34 generates a first walking instruction according to the first deviation signal and sends the first walking instruction to a battery swapping device 31, and the battery swapping device 31 walks according to the first walking instruction until the lock shafts 11 directly face the openings of the lock slots 22.

Step S10, the battery 1 is moved towards a fixing base 2 to enable the lock shafts 11 to enter the lock slots 22. A distance from the battery 1 to the ground is detected by a first range finder in the locking location detection unit 35, and the first range finder measures the distance from the battery 1 to the ground and compares the distance with a preset value. In a process that the battery 1 moves towards the fixing base 2, the first range finder measures the distance from the battery 1 to the ground, compares the distance with the preset value and generates a first distance signal to be sent to the data exchange unit 34, the data exchange unit 34 generates a first movement instruction according to the first distance signal and sends the first movement instruction to the battery swapping device 31, and the battery swapping device 31 moves the battery 1 according to the first movement instruction. When the distance from the battery 1 to the ground reaches the preset value, it shows that the battery 1 is located in the fixing base 2, and the lock shafts 11 have been located in the lock slots 22.

Step S20, after the lock shafts 11 enter the lock slots 22, the locations of the lock shafts 11 are detected, and the battery 1 is moved until the lock shafts 11 arrive at locking locations.

Step S20 includes:

step S20-1, when it is detected that the lock shafts 11 arrive at junctions of entry sections 221 and locking sections 222, a movement direction of the battery 1 is changed, and the lock shafts 11 are controlled to enter the locking sections 222. Specifically, whether the lock shafts 11 arrive at the junctions of the entry sections 221 and the locking sections 222 or not is detected by upper in-place sensors 321, if yes, a first location signal is sent to the data exchange unit 34, the data exchange unit 34 sends the first location signal to the battery swapping device 31, and the battery swapping device 31 moves the lock shafts 11 to the locking sections 222 according to the first location signal.

Step S20-2, when it is detected that the lock shafts 11 arrive at the locking locations, and the movement of the battery 1 is paused. Whether the lock shafts 11 arrive at the locking locations or not is detected by front in-place sensors 322, if yes, a second location signal is sent to the battery swapping device 31 by the data exchange unit 34, the battery swapping device 31 generates a locking stopping instruction according to the second location signal and sends the locking stopping instruction to the lock tongue control unit 33, the lock tongue control unit 33 controls the lock tongues 23 to fall into the lock slots 22.

Step S30, the lock tongues 23 are controlled to fall, and the lock shafts 11 are snapped into the lock slots 22. Specifically, the data exchange unit 34 sends the locking stopping instruction to a linkage mechanism, the linkage mechanism drives the plurality of lock tongues 23 to act through a lock connecting rod 331 when receiving the locking stopping instruction, and the lock tongues 23 fall into the lock slots 22.

Step S40, the locations of the lock tongues 23 are detected, and whether the lock tongues 23 snap the lock shafts 11 or not is judged; if not, an alarm is given. Specifically, locking sensors 323 detect whether the lock tongues 23 arrive at locations where the lock shafts 11 are snapped or not, if the lock tongues 23 have snapped the lock shafts 11, the data exchange unit 34 sends a signal to the battery swapping device 31, the battery swapping device 31 retracts. If the lock tongues 23 do not snap the lock shafts 11, the data exchange unit 34 gives an alarm to wait for operating staff to remove obstacles.

By using the above-mentioned battery locking control method, the location of the battery 1 is measured in real time when being locked, and the battery 1 is guaranteed to be automatically controlled when being locked.

When the above-mentioned battery locking control method is applied to the electric vehicle battery swapping control, the battery of the electric vehicle may be accurately controlled in the locking process, thereby achieving full-automatic control during swapping of the battery and improving the swapping speed and success rate of the battery.

Figure 9:
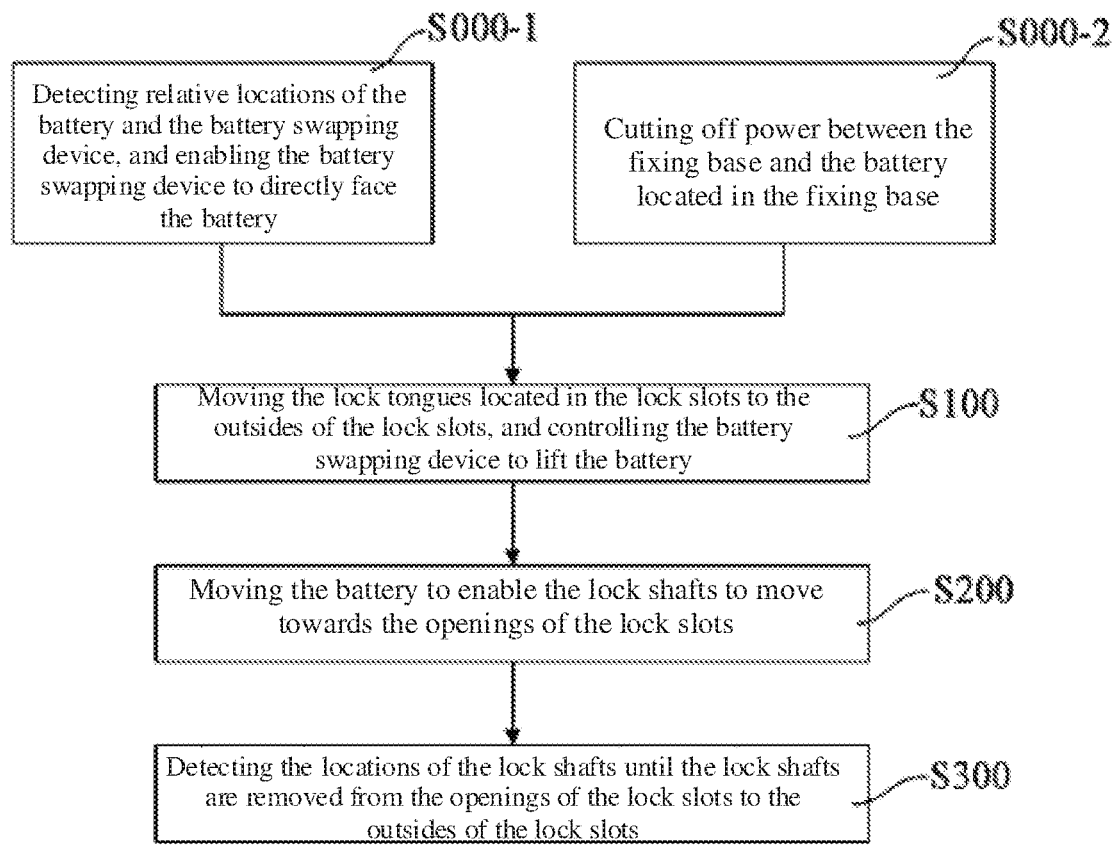
FIG. 9 is a flow diagram of a battery unlocking control method provided by the present invention.

As shown in FIG. 9, the present invention further provides a battery unlocking control method including the following steps:

step S100, lock tongues 23 located in lock slots 22 are moved to the outsides of the lock slots 22, and a battery swapping device 31 is controlled to lift a battery 1;

step S200, the battery 1 is moved to enable lock shafts 11 to move towards openings of the lock slots 22; and step S300, locations of the lock shafts 11 are detected until the lock shafts 11 are removed from the openings of the lock slots 22 to the outsides of the lock slots 22.

By using the above-mentioned battery unlocking control method, the battery 1 may be unlocked and removed from the fixing base 2.

The above-mentioned step S300 that locations of the lock shafts 11 are detected until the lock shafts 11 are removed from the openings of the lock slots 22 to the outsides of the lock slots 22 specifically includes: when it is detected that the lock shafts 11 arrive at junctions of entry sections 221 and locking sections 222, a movement direction of the battery 1 is changed, and the lock shafts 11 are controlled to enter the entry sections 221.

The above-mentioned step S100 that lock tongues 23 located in lock slots 22 are moved to the outsides of the lock slots 22, and a battery swapping device 31 is controlled to lift a battery 1 specifically includes: a distance from the battery swapping device 31 to the battery 1 is detected until the battery swapping device 31 lifts the battery 1.

The above-mentioned step S100 that lock tongues 23 located in lock slots 22 are moved to the outsides of the lock slots 22, and a battery swapping device 31 is controlled to lift a battery 1 specifically includes: an unlocking ejector rod 333 is controlled to jack up a lock connecting rod 331 to drive the lock tongues 23 to move to the outsides of the lock slots 22 while the battery swapping device 31 is controlled to lift the battery 1.

Before the above-mentioned step S100 that lock tongues 23 located in lock slots 22 are moved to the outsides of the lock slots 22, and a battery swapping device 31 is controlled to lift a battery 1, there is also step S000-1 including: relative locations of the battery 1 and the battery swapping device 31 are detected, and the battery swapping device 31 is enabled to directly face the battery 1.

Before the above-mentioned step S100 that lock tongues 23 located in lock slots 22 are moved to the outsides of the lock slots 22, and a battery swapping device 31 is controlled to lift a battery 1, there is also step S000-2 including: power between the fixing base 2 and the battery 1 located in the fixing base 2 is cut off.

A specific embodiment of the above-mentioned battery unlocking control method is that:

step S000-1, relative locations of a battery 1 and a battery swapping device 31 are detected, and the battery swapping device 31 is enabled to directly face the battery 1. Whether the battery swapping device 31 directly faces the battery 1 or not is detected by a second visual sensor in an unlocking location detection unit 36. The second visual sensor detects the deviation between the battery 1 and the battery swapping device 31 by acquiring images of the battery 1 and the battery swapping device 31 and generates a second deviation signal to be sent to a data exchange unit 34, the data exchange unit 34 generates a second walking instruction according to the second deviation signal and sends the second walking instruction to the battery swapping device 31, and the battery swapping device 31 walks according to the second walking instruction until the battery swapping device 31 directly faces the battery 1.

Step S000-2, power between a fixing base 2 and the battery 1 located in the fixing base 2 is cut off. The power between the fixing base 2 and the battery 1 located in the fixing base 2 is cut off by a power switching unit 37. The power switching unit 37 is used for controlling whether the battery 1 supplies power to an external device or not, the battery swapping device 31 sends a power failure signal to the power switching unit 37 before sending an unlocking instruction, and the power switching unit 37 controls the battery 1 to stop supplying power to the external device.

Step S100, lock tongues 23 located in lock slots 22 are moved to the outsides of the lock slots 22, and the battery swapping device 31 is controlled to lift the battery 1.

A distance from the battery swapping device 31 to the battery 1 is detected until the battery swapping device 31 lifts the battery 1. The distance from the battery swapping device 31 to the battery 1 is detected by a second range finder in the unlocking location detection unit 36. The second range finder measures a distance from the battery swapping device 31 to the ground, compares the distance with a preset value and generates a second distance signal to be sent to the data exchange unit 34, the data exchange unit 34 generates a second movement instruction according to the second distance signal and sends the second movement instruction to the battery swapping device 31, and the battery swapping device 31 moves according to the second movement instruction until the battery swapping device 31 lifts the battery 1.

An unlocking ejector rod 333 is controlled to jack up a lock connecting rod 331 to drive the lock tongues 23 to move to the outsides of the lock slots 22 while the battery swapping device 31 is controlled to lift the battery 1. The data exchange unit 34 sends an unlocking instruction to a lock tongue control unit 33, when the lock tongue control unit 33 receives the unlocking instruction, the unlocking ejector rod 333 jacks up the lock connecting rod 331, and the lock connecting rod 331 drives the lock tongues 23 to leave from the lock slots 22.

Step S200, the battery 1 is moved to enable lock shafts 11 to move towards the openings of the lock slots 22. The battery 1 is moved by moving the battery swapping device 31.

Step S300, the locations of the lock shafts 11 are detected until the lock shafts 11 are removed from the openings of the lock slots 22 to the outsides of the lock slots 22. When it is detected that the lock shafts 11 arrive at the junctions of the locking sections 222 and the entry sections 221, the movement direction of the battery 1 is changed, and the lock shafts 11 are controlled to enter the entry sections 221. Upper in-place sensors 321 are used for detecting whether the lock shafts 11 arrive at the junctions of the entry sections 221 and the locking sections 222 or not, if yes, a first location signal is sent to the data exchange unit 34, the data exchange unit 34 sends the first location signal to the battery swapping device 31, and the battery swapping device 31 enables the lock shafts 11 to move to the entry sections 221 according to the first location signal. Then, the battery swapping device 31 enables the battery to fall until the lock shafts 11 are removed from the openings of the lock slots 22 to the outsides of the lock slots 22.

According to the battery locking/unlocking system and the locking and unlocking control methods, by providing various location detection components, the battery is accurately located and locked when being loaded into the fixing base, and then accurately located and unlocked when being removed from the fixing base.

When the above-mentioned battery unlocking control method is applied to electric vehicle battery swapping control, the battery of the electric vehicle may be accurately controlled in the unlocking process, thereby, achieving full-automatic control during swapping of the battery and improving the swapping speed and success rate of the battery.

The present invention is not limited to the above-mentioned embodiments, any variations on the shape or structure thereof shall fall within the protective scope of the present invention. The protective scope of the present invention is limited by the appended claims, those skilled in the art can make various alterations or modifications on these embodiments without departing from the principle and essence of the present invention, but these alterations and modifications fall within the protective scope of the present invention.

The invention claimed is:

1. A battery locking/unlocking system, used for a connection between a battery and a fixing base, the battery being provided with a plurality of lock shafts, the fixing base being internally provided with a plurality of lock seats, the lock seats being provided with lock slots for snapping the lock shafts, the lock slots being internally provided with lock tongues, characterized in the battery locking/unlocking system comprises:

a battery swapping device, used for moving the battery;

a lock shaft detection unit, located in the lock slots and used for detecting the locations of the lock shafts in the lock slots and generating location signals;

a lock tongue control unit, used for controlling the lock tongues to fall into the lock slots or retract to the outsides of the lock slots; and a data exchange unit, separately communicating with the battery swapping device and the lock shaft detection unit;

the lock shaft detection unit sends the location signals to the data exchange unit; the data exchange unit sends the location signals to the battery swapping device, and the battery swapping device adjusts the location of the battery according to the location signals; the battery swapping device further generates a locking stopping instruction or an unlocking instruction according to the location signals and sends the locking stopping instruction or the unlocking instruction to the lock tongue control unit, the lock tongue control unit controls the lock tongues to fall into the lock slots when receiving the locking stopping instruction or controls the lock tongues to retract to the outsides of the lock slots when receiving the unlocking instruction.

2. The battery locking/unlocking system according to claim 1, characterized in the lock slots comprise entry sections and locking sections communicating with each other, the lock shaft detection unit comprises upper in-place sensors, and the upper in-place sensors are located in the entry sections;

the upper in-place sensors are used for detecting whether the lock shafts arrive at junctions of the entry sections and the locking sections or not, if yes, a first location signal is sent to the data exchange unit, the data exchange unit sends the first location signal to the battery swapping device, and the battery swapping device enables the battery to move to the entry sections or the locking sections according to the first location signal;

and/or the lock slots comprise entry sections and locking sections communicating with each other, the lock shaft detection unit comprises front in-place sensors, and the front in-place sensors are located in the locking sections;

the front in-place sensors are used for detecting whether the lock shafts arrive at locking locations or not, if yes, a second location signal is sent to the battery swapping device by the data exchange unit, the battery swapping device stops horizontally moving the battery according to the second location signal and generates the locking stopping instruction, the battery swapping device sends the locking stopping instruction to the lock tongue control unit, and the lock tongue control unit controls the lock tongues to fall into the lock slots when receiving the locking stopping instruction.

3. The battery locking/unlocking system according to claim 1, characterized in the lock shaft detection unit further comprises locking sensors; the locking sensors are used for detecting whether the lock shafts are locked by the lock tongues or not; if yes, the locking sensors generate a locking signal to be sent to the data exchange unit; and if not, a warning signal is sent to the data exchange unit, and the data exchange unit gives an alarm according to the warning signal.

4. The battery locking/unlocking system according to claim 1, characterized in the battery locking/unlocking system further comprises a locking location detection unit located on the battery swapping device; and the locking location detection unit is used for detecting relative locations of the battery and the fixing base and generating a locking location signal to be sent to the data exchange unit, the data exchange unit generates a locking adjustment instruction according to the locking location signal and sends the locking adjustment instruction to the battery swapping device, the location of the battery swapping device is adjusted according to the locking adjustment instruction until the battery is located in the fixing base.

5. The battery locking/unlocking system according to claim 4, characterized in the locking location detection unit comprises a first visual sensor, the first visual sensor detects the deviation between openings of the lock slots and the lock shafts by acquiring images of the openings of the lock slots and the lock shafts and generates a first deviation signal to be sent to the data exchange unit, the data exchange unit generates a first walking instruction according to the first deviation signal and sends the first walking instruction to the battery swapping device, and the battery swapping device walks according to the first walking instruction until the lock shafts directly face the openings of the lock slots;

and/or the locking location detection unit comprises a first range finder, in a process that the battery moves towards the fixing base, the first range finder measures a distance from the battery to the ground, compares the distance with a preset value and generates a first distance signal to be sent to the data exchange unit, the data exchange unit generates a first movement instruction according to the first distance signal and sends the first movement instruction to the battery swapping device, and the battery swapping device moves the battery according to the first movement instruction until the battery is located in the fixing base.

6. The battery locking/unlocking system according to claim 1, characterized in the battery locking/unlocking system further comprises an unlocking location detection unit located on the battery swapping device; the unlocking location detection unit is used for detecting relative locations of the battery swapping device and the battery and generating an unlocking location signal to be sent to the data exchange unit, the data exchange unit generates an unlocking adjustment instruction according to the unlocking location signal and sends the unlocking adjustment instruction to the battery swapping device, and the location of the battery swapping device is adjusted according to the unlocking adjustment instruction until the battery swapping device lifts the battery.

7. The battery locking/unlocking system according to claim 6, characterized in the unlocking location detection unit comprises a second visual sensor, the second visual sensor detects the deviation between the battery and the battery swapping device by acquiring images of the battery and the battery swapping device and generates a second deviation signal to be sent to the data exchange unit, the data exchange unit generates a second walking instruction according to the second deviation signal and sends the second walking instruction to the battery swapping device, and the battery swapping device walks according to the second walking instruction until the battery swapping device directly faces the battery;

and/or the unlocking location detection unit comprises a second range finder, the second range finder measures a distance from the battery swapping device to the ground, compares the distance with a preset value and generates a second distance signal to be sent to the data exchange unit, the data exchange unit generates a second movement instruction according to the second distance signal and sends the second movement instruction to the battery swapping device, and the battery swapping device moves according to the second movement instruction until the battery swapping device lifts the battery.

8. The battery locking/unlocking system according to claim 1, characterized in the lock tongue control unit comprises a lock connecting rod and a linkage mechanism driving the lock connecting rod to act; and the lock tongues in the plurality of lock seats are connected through the lock connecting rod.

9. The battery locking/unlocking system according to claim 8, characterized in the linkage mechanism is in communication connection with the data exchange unit, the data exchange unit sends the locking stopping instruction to the linkage mechanism, the linkage mechanism drives the plurality of lock tongues to act through the lock connecting rod when receiving the locking stopping instruction, and the lock tongues fall into the lock slots;

and/or the lock tongue control unit comprises an unlocking ejector rod, the data exchange unit sends the unlocking instruction to the lock tongue control unit, when the lock tongue control unit receives the unlocking instruction, the unlocking ejector rod jacks up the lock connecting rod, and the lock connecting rod drives the lock tongues to leave from the lock slots.

10. The battery locking/unlocking system according to claim 1, characterized in the battery locking/unlocking system further comprises a power switching unit used for controlling whether the battery supplies power to an external device or not, the battery swapping device sends a power failure signal to the power switching unit before sending the unlocking instruction, and the power switching unit controls the battery to stop supplying power to the external device.

11. An electric vehicle battery swapping control system, characterized in the electric vehicle battery swapping control system comprises the battery locking/unlocking system according to claim 1.

* * * * *